United States Patent [19]
Takashima et al.

[11] Patent Number: 5,741,475
[45] Date of Patent: Apr. 21, 1998

[54] CATALYTIC REACTION METHOD

[75] Inventors: Takumi Takashima; Tadayoshi Tanaka; Takahiro Fujii; Takuya Doi, all of Tsukuba, Japan

[73] Assignee: Agency of Industrial Science & Technology, Tokyo, Japan

[21] Appl. No.: 723,809

[22] Filed: Sep. 30, 1996

Related U.S. Application Data

[63] Continuation of Ser. No. 321,890, Oct. 14, 1994, abandoned.

[30] Foreign Application Priority Data

Oct. 15, 1993 [JP] Japan ................... 5-281802

[51] Int. Cl.$^6$ .................... C07C 29/141; C01B 17/24
[52] U.S. Cl. .................. 423/559; 423/533; 423/DIG. 6; 568/881
[58] Field of Search .................. 423/572, 533, 423/534, 535, DIG. 6, 659; 568/881

[56] References Cited

U.S. PATENT DOCUMENTS

| | | | |
|---|---|---|---|
| 690,133 | 12/1901 | Clemm et al. | 423/534 |
| 729,735 | 6/1903 | Clemm et al. | 423/534 |
| 1,518,043 | 12/1924 | Audianne et al. | 423/534 |
| 1,812,341 | 7/1931 | Jaeger | 423/533 |
| 1,965,963 | 7/1934 | Merriam | 423/534 |
| 2,079,507 | 9/1937 | Johnson | 423/522 |
| 3,789,019 | 1/1974 | Stiles | 423/535 |
| 3,897,545 | 7/1975 | Reh et al. | 423/534 |
| 5,081,321 | 1/1992 | Fukuhara et al. | 568/881 |

FOREIGN PATENT DOCUMENTS

| | | |
|---|---|---|
| 58-181702 | 10/1983 | Japan . |
| 58-181702A | 10/1983 | Japan . |
| 61-286203 | 12/1986 | Japan . |
| 61-286203A | 12/1986 | Japan . |

*Primary Examiner*—Gary P. Straub
*Attorney, Agent, or Firm*—Spencer & Frank

[57] ABSTRACT

A catalytic reaction apparatus includes a catalytic reaction vessel containing a catalyst for an exothermic reaction. First and second catalyst regions contain a catalyst and have different catalytic performances from one another. At least two raw materials are introduced in the catalytic reaction vessel and passed through the first and second catalyst regions to react to generate heat. The heat is transferred to a heat medium arranged outside and contacting the catalytic reaction vessel so that distribution of temperature is controlled in the catalytic reaction vessel. The difference in catalytic performance is achieved by controlling concentration of the catalyst or by using different catalyst species.

18 Claims, 3 Drawing Sheets

CATALYTIC REACTION METHOD

This application, is a continuation of application Ser. No. 08/321,890 filed Oct. 14, 1994 now abandoned.

BACKGROUND OF THE INVENTION

1. Field of the Invention

The present invention relates to catalytic reaction method and apparatus for utilizing thermal energy generated by chemical reactions using catalysts.

2. Description of Related Art

Catalytic reaction apparatuses having catalytic reaction tubes have been used after they were filled with catalysts uniformly and heat or thermal energy generated by the reaction in the reaction tube has been taken out with a heat collecting medium arranged outside the reaction tube as will be described below with reference to FIGS. 1 and 2. FIG. 1 is a schematic cross-sectional view showing a conventional catalytic reaction tube in a catalytic reaction apparatus. FIG. 2 is a graph illustrating distribution of temperature in the conventional catalytic reaction tube. In FIG. 1, reference numeral 10 designates a catalytic reaction tube for carrying out a catalytic reaction, 12 is an inlet side of the catalytic reaction tube 10, and 14 is an outlet side of the catalytic reaction tube 10. A and B designate first and second raw materials for the reaction, C and D designates first and second products produced by the reaction, X is a catalyst, F is a heat medium, and Q indicates reaction heat generated by the reaction.

As shown in FIG. 1, the catalyst X is arranged or distributed uniformly in the catalytic reaction tube 10. At the inlet side 12 of the catalytic reaction tube, the first and second raw materials A and B are introduced and brought in contact with the catalyst X to produce the first and second products C and D, for example, which are outputted at the outlet side 14 of the catalytic reaction tube 10. The catalytic reaction generates reaction heat, which transmits through a wall 16 of the catalytic reaction tube 10 to the heat medium F. The heat medium F flows along the wall 16 of the catalytic reaction tube 10 in the direction from the inlet side 12 toward outlet side 14, that is, concurrently with the flow of the raw materials A and B. In the above-described conventional method, there appears a localized high temperature region inside the catalytic reaction tube 10 as shown in FIG. 2. More particularly, in the conventional catalytic reaction tube 10, which is filled with the catalyst X uniformly, the raw materials A and B react with each other while they are flowing through the catalytic reaction tube. An increasing amount of heat generates or the inside temperature increases according as the position Px along an axis of the catalytic reaction tube 10 approaches from the position Pi at the inlet to the position Po at the outlet of the catalytic reaction tube 10 up to a certain position Pm. Beyond the position PM, heat generation decreases due to a decrease in the amounts of unreacted raw materials so that the loss of heat by transmission exceeds the heat generation by the chemical reaction. In this manner, there appears a peak in a curve 18. In accordance with this change in the inner temperature of the chemical reaction tube 10, the temperature of the heat medium F changes as represented by a curve 19.

Therefore, when heat is taken out with the heat medium F by the conventional method, the outlet temperature of the heat medium F depends on the temperature at the outlet side 14 of the catalytic reaction tube 10 and, hence, it is impossible to supply heat to the external system at a temperature exceeding that of the outlet side 14 of the catalytic reaction tube 10. Therefore, the reaction heat generated inside the catalytic reaction tube 10 has not always been utilized efficiently.

As described above, with the method and apparatus using the conventional catalytic reaction tube 10 that is filled with a catalyst uniformly, not only the inner temperature of the tube 10 locally increases so that the reaction conditions vary locally but also the reaction temperature at the outlet side 14 of the reaction tube 10 is lower than that of the heat medium F. Therefore, no efficient heat exchange with the external system. Furthermore, there is a problem that such a local temperature increase results in the production of undesired by-products.

SUMMARY OF THE INVENTION

The present invention has been completed with view to obviating the above-described defects of the conventional technology and provides a catalytic reaction method and apparatus which permit efficient heat exchange and variation of the composition of a reaction product or products.

According to a first aspect of the present invention, there is provided a catalytic reaction method for carrying out an exothermic reaction using a catalyst, comprising the steps of:

providing a catalytic reaction vessel containing a catalyst for a reaction and having therein first and second catalyst regions containing the catalyst, the first and second catalyst regions having different catalytic performances from one another;

introducing at least two raw materials in the catalytic reaction vessel and passing the raw materials through the first and second catalyst regions to react the raw materials with each other with generating heat;

transferring the heat to a heat medium arranged outside and contacting the catalytic reaction vessel;

whereby controlling distribution of temperature in the catalytic reaction vessel.

Here, the first and second catalyst regions may have different concentrations per unit volume from one another.

The first and second catalyst regions may have different catalytic activities from one another.

The catalytic reaction method may further comprise at least one catalyst region between the first and second catalyst regions, the at least one catalyst region having a catalytic performance between those of the first and second catalyst regions.

The catalyst regions may be arranged in order of catalytic performance.

The catalytic regions may be arranged so that a uniform temperature distribution is obtained in the catalytic reaction vessel.

The raw materials may be acetone and hydrogen, and the catalyst may be nickel ultrafine grains.

The raw materials may be acetone and hydrogen, and the first catalyst region may contain a palladium catalyst and the second catalyst region may contain a ruthenium catalyst.

According to a second aspect of the present invention, there is provided a catalytic reaction method for carrying out an exothermic reaction using a catalyst, comprising the steps of:

providing a catalytic reaction vessel containing a catalyst for a reaction and having therein first and second catalyst regions containing the catalyst, the first and second catalyst regions having different catalytic performances from one another;

introducing at least two raw materials in the catalytic reaction vessel and passing the raw materials through the first and second catalyst regions to react the raw materials with each other with generating heat;

transferring the heat to a heat medium arranged outside and contacting the catalytic reaction vessel;

whereby varying composition of products produced in the catalyst regions one from another.

Here, the first and second catalyst regions may have different concentrations per unit volume from one another.

The first and second catalyst regions may have different catalytic activities from one another.

The catalytic reaction method may further comprise at least one catalyst region between the first and second catalyst regions, the at least one catalyst region having a catalytic performance between those of the first and second catalyst regions.

The catalyst regions may be arranged in order of catalytic performance.

The catalytic regions may be arranged so that a uniform temperature distribution is obtained in the catalytic reaction vessel.

The raw materials may be acetone and hydrogen, and the catalyst may be nickel ultrafine grains.

The raw materials may be acetone and hydrogen, and the first catalyst region may contain a palladium catalyst and the second catalyst region may contain a ruthenium catalyst.

According to a third aspect of the present invention, there is provided a catalytic reaction apparatus for carrying out an exothermic reaction using a catalyst, comprising:

a first vessel for containing a first raw material for the reaction;

a second vessel for containing a second raw material for the reaction;

a catalytic reaction vessel which is connected to the first and second vessels and receives the first and second raw materials for reaction, the catalytic reaction vessel containing a catalyst for the reaction and having a first catalyst region having a relatively low catalytic performance and a second catalyst region having a relatively high catalytic performance;

a first heat exchanger arranged in the catalytic reaction vessel, the first heat exchanger containing a heat fluid flowing therethrough and brought in contact with the catalytic reaction vessel so that the heat fluid is heated by heat generated in the catalytic reaction vessel;

a third vessel connected to the first heat exchanger for containing the heat medium and sending it to the first exchanger;

a second heat exchanger connected to the first heat exchanger for receiving the heat medium and transferring heat to an objective;

a fourth vessel connected to the catalytic reaction vessel for receiving a product produced in the catalytic reaction vessel; and a passage means connected to the fourth vessel for returning the heat medium from the second heat exchanger to the third vessel.

Here, the first and second catalyst regions may have different concentrations per unit volume from one another.

The first and second catalyst regions may have different catalytic activities from one another.

The catalytic reaction apparatus may further comprise at least one catalyst region between the first and second catalyst regions, the at least one catalyst region having a catalytic performance between those of the first and second catalyst regions.

The catalyst regions may be arranged in order of catalytic performance.

The catalytic regions may be arranged so that a uniform temperature distribution is obtained in the catalytic reaction vessel.

The raw materials may be acetone and hydrogen, and the catalyst may be nickel ultrafine grains.

The raw materials may be acetone and hydrogen, and the first catalyst region may contain a palladium catalyst and the second catalyst region may contain a ruthenium catalyst.

With the catalyst reaction method and apparatus of the present invention, the catalyst used is arranged in a catalytic reaction tube so that its concentration or composition distributes in an appropriate manner for the purpose of the reaction. Such a distribution prevents local elevation of temperature and enables an efficient supply of reaction heat to an external heat medium. Also, it prevents production of undesired reaction by-products and controls the composition of a reaction product.

The above and other objects, effects, features and advantages of the present invention will become more apparent from the following description of the embodiment thereof taken in conjunction with the accompanying drawings.

DESCRIPTION OF PREFERRED EMBODIMENTS

Hereinafter, the present invention will be described in greater detail by embodiments with reference to the attached drawings. However, the present invention should not be construed as being limited thereto.

Embodiment 1

Figure 3:
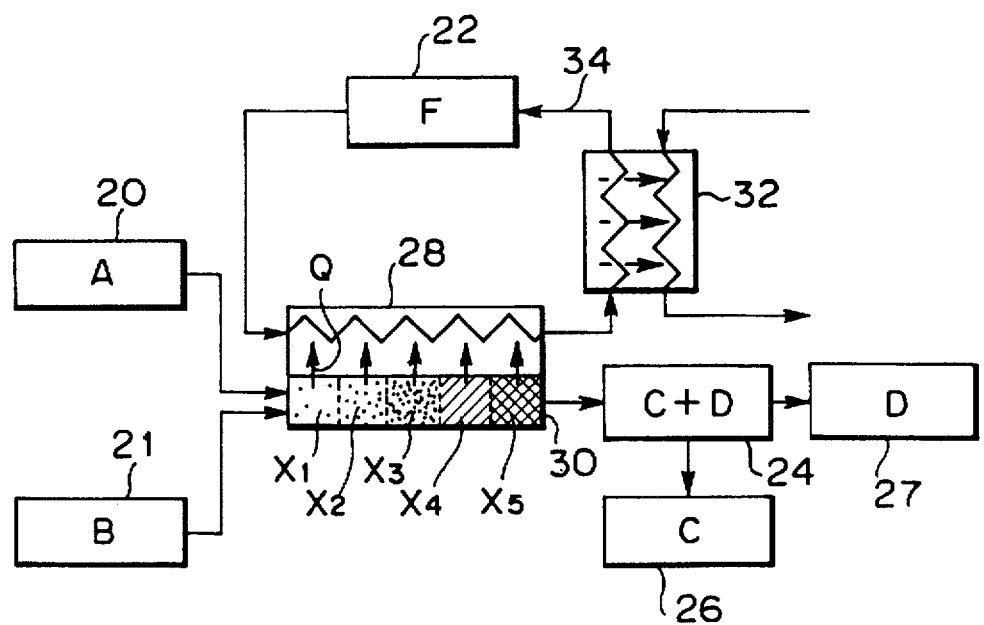
FIG. 3 is a block diagram showing a catalytic reaction apparatus according to an embodiment of the present invention.

FIG. 3 is a block diagram showing a catalytic reaction apparatus according to an embodiment of the present invention. In FIG. 3, reference numeral 20 denotes a first vessel which contains a raw material A. 21 is a second vessel which contains a raw material B. 22 is a third vessel which contains a heat medium F. 24 is a separator which separates products C and D. 26 and 27 are fourth and fifth vessels which contain products C and D, respectively. 28 is a first heat exchanger, which transfers heat generated in a catalytic reaction tube 30. 32 is a second heat exchanger which supplies the heat obtained in the first heat exchanger 28 to an objective which receives the heat. 34 is a conduit which returns the heat medium F to the third vessel from the second heat exchanger 32. The catalytic reaction tube 30 of the present invention has at least two catalyst regions which have different catalytic performances from each other. In this embodiment, the catalytic reaction tube 30 has five catalyst regions X1, X2, X3, X4 and X5 arranged from the inlet to outlet of the catalytic reaction tube. These catalyst regions have different catalytic performances so that the amounts of heat generated in the catalytic regions differ from each other. More particularly, the catalytic regions X1 to X5 are adjusted so as to generate increasing amounts of heat. In other words, the catalyst regions are arranged such that the raw materials A and B can contact a catalyst region having a higher catalytic performance according as they flow in the catalytic reaction tube 30 and get closer to the outlet thereof. The raw materials A and B contained in the first vessel 20 and the second vessel 21, respectively, are fed into the catalytic reaction tube 30 where they contact the catalyst X, more specifically catalysts X1, X2, X3, X4 and X5 in the catalyst regions X1, X2, X3, X4 and X5, respectively, to produce products C and D, for example. The products C and D are fed to the separator 24 where they are separated and sent to a fourth vessel 26 and a fifth vessel 27, respectively. The heat medium F is fed to the first heat exchanger from the third vessel 22 in order to recover reaction heat Q generated in the chemical reaction between the raw materials A and B. The heat medium F, after having recovered in the first heat exchanger the heat generated by the chemical reaction transferred from the catalytic reaction tube 30, is fed to the second heat exchanger 32 where the heat medium F transfers the heat to the objective or heat receptor and then returned to the third vessel 22. The separator 24 provided between the fourth and fifth vessels 26 and 27 may be omitted depending on the purpose.

Figure 4:
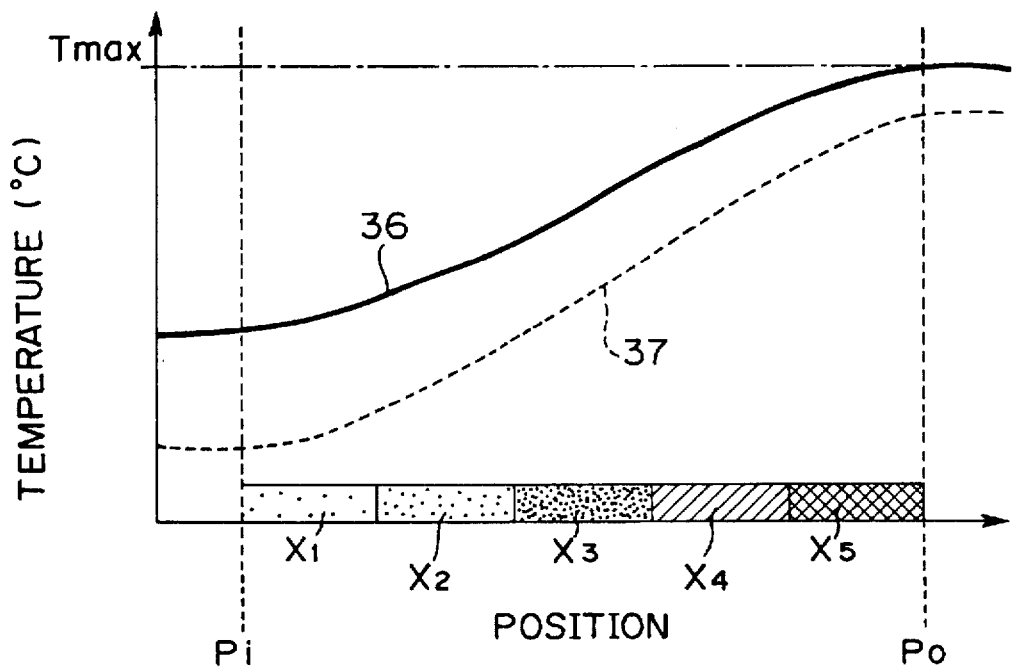
FIG. 4 is a graph illustrating a temperature distribution obtained according to the present invention.

In the present invention, at least two (for example, five) catalyst regions are provided in the catalytic reaction tube 30 in order to obtain a controlled temperature distribution as shown in FIG. 4. As shown in FIG. 4, the inner temperature of the catalytic reaction tube 30 in the catalytic reaction apparatus increases monotonically as represented by a curve 36 until it reaches a maximum Tmax at the position Po corresponding to the outlet of the catalytic reaction tube 30. On the other hand, the temperature of the heat medium 37 represented by a curve 37 is monotonic similarly to the curve 36 and reaches a maximum at the position Po. Therefore, the maximum temperature is available for heat transfer so that the reaction heat generated in the catalytic reaction tube 30 can be supplied to an external system efficiently. In addition, control of the temperature distribution in the catalytic reaction tube 30 enables prevention of the occurrence of undesired by-products during the catalytic chemical reaction.

Embodiment 2

Figure 5:
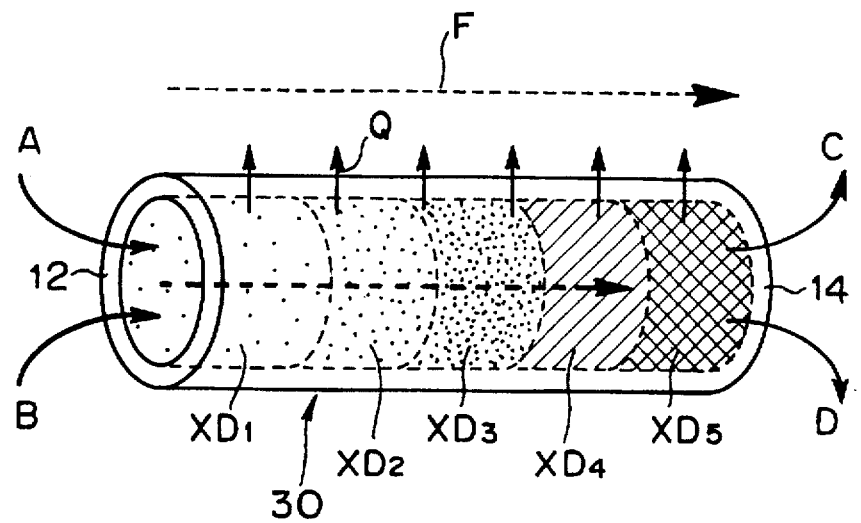
FIG. 5 is a schematic cross-sectional view showing a catalytic reaction tube according to an embodiment of the present invention used in the catalytic reaction apparatus shown in FIG. 3.

FIG. 5 is a schematic cross-sectional view showing a catalytic reaction tube according to an embodiment of the present invention having an optimized catalyst concentration used in the catalytic reaction apparatus shown in FIG. 3. In this embodiment, the overall structure of the catalytic reaction apparatus is the same as Embodiment 1 above except for the structure of the catalytic reaction tube 30, more particularly the arrangement of the catalyst X.

Figure 1:
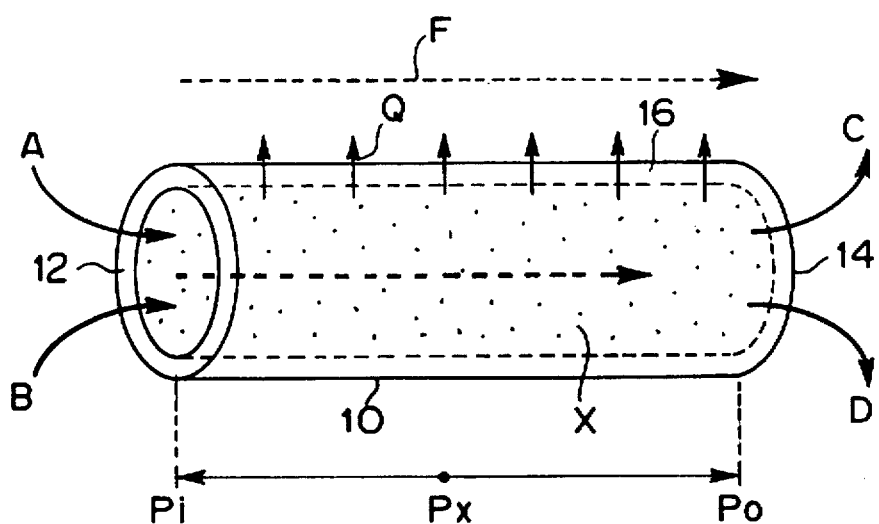
FIG. 1 is a schematic cross-sectional view showing a conventional catalytic reaction tube in a conventional catalytic reaction apparatus.

In FIG. 5, the same or like elements or members are indicated by the same reference numerals as in FIGS. 1 and 3. XD1, XD2, XD3, XD4 and XD5 indicates different catalyst regions with increasing catalyst concentrations from XD1 to XD5. Taking an example of hydrogenation reaction of acetone, for example, nickel ultrafine grains are used as a catalyst. The nickel ultrafine grains are diluted with different amounts of α-alumina to form catalyst compositions having different concentrations or densities in terms of amount or weight of catalyst per unit volume. Thus, there are obtained five catalyst regions whose catalyst concentration increase from the lowest (XD1) to the highest (XD5). The catalyst region XD5, the highest concentration region, may use nickel ultrafine grains without dilution.

With the above-described arrangement, as will be apparent from the temperature distribution shown in FIG. 4, the temperature at the outlet side 14 of the catalytic reaction tube 30 is the highest so that the reaction heat can be supplied to the external system efficiently. In addition, control of the temperature distribution in the catalytic reaction tube 30 enables prevention of the occurrence of undesired by-products during the catalytic chemical reaction.

Figure 2:
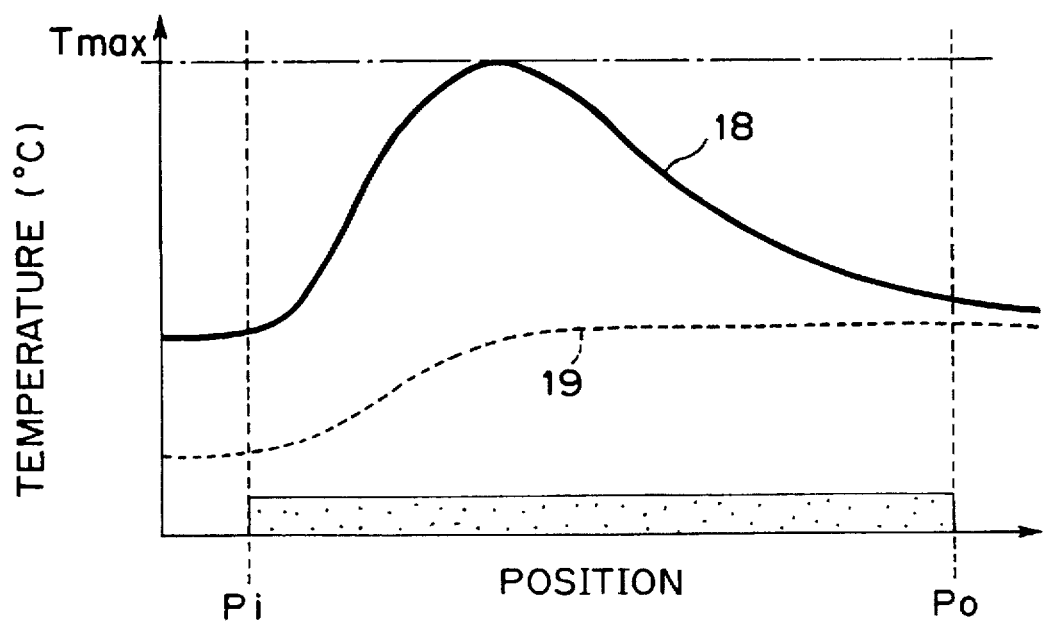
FIG. 2 is a graph illustrating a temperature distribution in a conventional catalytic reaction tube.

Use of two or more, for example five, catalyst concentrations in a controlled or adjusted arrangement ranging from the lowest concentration region XD1 to the highest concentration XD5 enables variation of temperature distribution in the catalytic reaction tube 30 to change reaction conditions which in turn vary the composition or proportion of the products C and D. In hydrogenation reaction of acetone, such a conventional temperature distribution in the catalytic reaction tube 10 as shown in FIG. 2 is undesirable since it will be difficult to obtain efficient heat exchange and effectively prevent the occurrence of by-products. By setting the temperature of the inlet side to the lowest temperature and the arrangement of catalyst with an increasing catalyst concentration in the direction in which the raw materials are fed in order to generate an increasing amount of heat, the occurrence of a local peak or maximum in the inner temperature can be prevented. As a result, a temperature distribution is obtained in which always transfer of heat from the catalytic reaction tube to the heat medium occurs.

Embodiment 3

The present invention applied to hydrogenation reaction of acetone will be described more specifically with reference to FIG. 5. Here, acetone and hydrogen are used as the raw materials A and B, respectively, that flow in the inlet side 12 of the catalytic reaction tube 30. Nickel ultrafine grains are used as the catalyst X. The heat medium is diphenyl ether. The same catalytic reaction apparatus as in Embodiment 2 is used. When acetone and hydrogen contact the nickel ultrafine grains, hydrogenation reaction of acetone, which is an exothermic reaction, takes place to produce 2-propanol as the product C with generating 55 kJ/mol of reaction heat. In relatively lower concentration regions, smaller amounts of reaction heat Q per unit volume of the catalyst composition are obtained since the catalytic activities are relatively lower. On the other hand, in relatively higher concentration regions, that have relatively higher catalytic activities, 4-methyl-2-pentanone may also be produced during hydrogenation reaction of acetone depending on the conditions of the catalyst, i.e., concentration per unit volume of the catalyst composition. The occurrence of the by-product can be prevented or controlled by controlling the temperature conditions of each catalyst region in the catalytic reaction tube 30 by varying the concentration of the catalyst.

Embodiment 4

Figure 6:
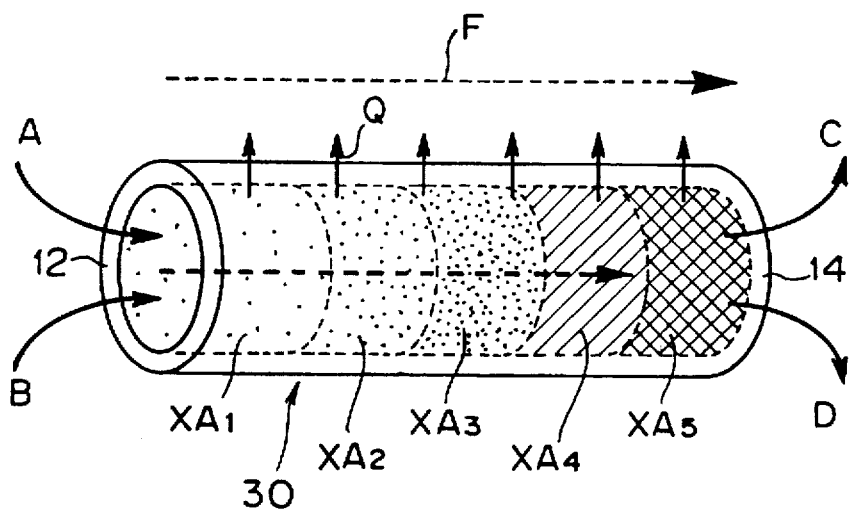
FIG. 6 is a schematic cross-sectional view showing catalytic reaction tube according to another embodiment of the present invention used in the catalytic reaction apparatus shown in FIG. 3.

FIG. 6 is a schematic cross-sectional view showing catalytic reaction tube according to another embodiment of the present invention used in the catalytic reaction apparatus shown in FIG. 3. In this embodiment, the composition of catalyst is varied along an axis of the catalytic reaction tube. In FIG. 6, catalyst regions XA1, XA2, XA3, XA4 and XA5 have increasing activities with XA1 being the lowest in activity. The same or like elements or members are indicated by the same reference numerals.

In this embodiment, the characteristic feature is that the temperature distribution in the catalytic reaction tube 30 is varied in accordance with the arrangement of the catalyst, more particularly at least two, e.g., five, catalyst regions having different activities relative to each other. Taking an example of hydrogenation reaction of acetone, a specific example of the catalyst having a relatively lower catalytic activity is a palladium catalyst and a specific example of the catalyst having a relatively higher catalytic activity is a ruthenium catalyst. The lowest activity region XA1 contains the palladium catalyst only and the highest activity region contains XA5 contains the ruthenium catalyst only. XA2 to XA4 each contains a mixture of these catalysts with varying ratios. In this embodiment, the composition of the products varies from catalyst region to catalyst region since the reaction conditions vary from catalyst region to catalyst region.

Variations

In hydrogenation reaction of acetone, the equilibrium conversion decreases as the reaction temperature increases and, hence, the amount of heat generated will decrease when the reaction temperature becomes too high and the amount of unreacted raw materials increases. In this case, it is necessary to obtain as much as heat with maintaining a high conversion. The method and apparatus of the present invention are useful in order to achieve uniform heat generation. For this purpose, the catalyst may be arranged in a manner such that the inner temperature of the catalytic reaction tube 30 is as uniform as possible in contrast to the temperature distribution as shown in FIG. 4.

Further, use of a different catalyst species in hydrogenation reaction of acetone results in a different by-product species or compound due to a different selectivity in the reaction. For example, a platinum catalyst has a higher activity for hydrogenolysis (destructive hydrogenation) of acetone than a palladium catalyst so that the platinum catalyst tends to produce more propane than the palladium catalyst does.

According to the present invention, it is not necessary that the reaction involves two raw materials A and B and give rise to two products C and D. If the reaction uses at least one raw material and at least one product is obtained, desired temperature distribution can be determined by applying the principle of the present invention.

Use of 3 or more catalysts concentrations or catalyst species, more finely divided temperature distribution can be determined.

Temperature distributions inside or outside of a planar catalytic reaction vessel can be determined similarly to a tubular catalytic reaction vessel or catalytic reaction tube by applying the principle of the present invention.

The present invention has been described in detail with respect to an embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A catalytic reaction method for carrying out exothermic reactions using a catalyst, comprising:

a. providing a reaction vessel for carrying out exothermic catalytic reactions therein and having first and second regions therein positioned sequentially to and in communication with one another and respectively containing first and second catalysts for the exothermic catalytic reactions;

b. introducing a flow of at least one raw material into the reaction vessel and passing the flow through the first and second regions for exothermic reaction of the at least one raw material to produce at least one product with generation of heat so that each respective region has a temperature which increases as the flow is passed therethrough; and c. transferring the heat to a heat transfer medium which is arranged outside of and in contact with the reaction vessel and which flows co-currently with the flow through the reaction vessel, wherein the first and second catalysts have respective catalyst compositions comprising at least one catalytic material which is the same at least one catalytic material but which has a respective concentration per unit volume which is different so that respective activities of the first and second catalysts are different from each other, so that heat generation rate during exothermic reaction is controlled by controlling the difference in activity between the first and second catalysts, and so that the first and second regions have different catalytic performances from one another for at least one of (a) product production and (b) heat production.

2. The catalytic reaction method as claimed in claim 1, wherein the heat transfer medium flows at a constant rate.

3. The catalytic reaction method as claimed in claim 1, wherein the reaction vessel further comprises at least one additional region provided between and in communication with the first and second regions, the at least one additional region having a catalytic performance which lies between those of the first and second regions.

4. The catalytic reaction method as claimed in claim 3, wherein the regions are arranged contiguously within the reaction vessel in order of increasing catalytic activity.

5. The catalytic reaction method as claimed in claim 1, wherein the at least one raw material includes acetone and hydrogen, and wherein the first and second catalysts have respective catalyst compositions comprising Raney nickel and a carrier in respective concentrations of the nickel per unit volume which are different from each other.

6. The catalytic reaction method as claimed in claim 1, wherein the reaction vessel has an inlet side and an outlet side, and wherein the temperature distribution of the reaction vessel increases substantially linearly from the inlet side to the outlet side thereof.

7. A catalytic reaction method for carrying out exothermic reactions using a catalyst, comprising:

a. providing a reaction vessel for carrying out exothermic catalytic reactions therein and having first and second regions therein positioned sequentially to and in communication with one another and respectively containing first and second catalysts for the exothermic catalytic reactions;

b. introducing a flow of at least one raw material into the reaction vessel and passing the flow through the first and second regions for exothermic reaction of the at least one raw material to produce at least one product with generation of heat so that each respective region has a temperature which increases as the flow is passed therethrough; and c. transferring the heat to a heat transfer medium which is arranged outside of and in contact with the reaction vessel and which flows co-currently with the flow through the reaction vessel, wherein the first and second catalysts have respective catalyst compositions comprising respective at least one catalytic materials which are different from one another so that respective activities and selectivities of the first and second catalysts are different from each other, so that heat generation rate during exothermic reaction is controlled by controlling the difference in activity between the first and second catalysts, and so that the first and second regions have different catalytic performances from one another for at least one of (a) product production and (b) heat production.

8. The catalytic reaction method as claimed in claim 7, wherein the heat transfer medium flows at a constant rate.

9. The catalytic reaction method as claimed in claim 7, wherein the reaction vessel further comprises at least one additional region provided between and in communication with the first and second regions, the at least one additional region having a catalytic performance which lies between those of the first and second regions.

10. The catalytic reaction method as claimed in claim 9, wherein the regions are arranged contiguously within the reaction vessel in order of increasing catalytic activity.

11. The catalytic reaction method as claimed in claim 7, wherein the at least one raw material includes acetone and hydrogen, wherein the first catalyst is a palladium catalyst comprising palladium and the second catalyst is a ruthenium catalyst comprising ruthenium, and wherein the exothermic catalytic reaction produces 2-propanol as a main product and 4-methyl-2-pentanone as a by-product.

12. The catalytic reaction method as claimed in claim 7, wherein the reaction vessel has an inlet side and an outlet side, and wherein the temperature distribution of the reaction vessel increases substantially linearly from the inlet side to the outlet side thereof.

13. A catalytic reaction method for carrying out exothermic reactions using a catalyst, comprising:

a. providing a reaction vessel for carrying out exothermic catalytic reactions therein and having first and second regions therein positioned sequentially to and in communication with one another and respectively containing first and second catalysts for the exothermic catalytic reactions;

b. introducing a flow of at least two raw materials into the reaction vessel and passing the flow through the first and second regions for exothermic reaction of the at least two raw materials with each other with generation of heat so that each respective region has a temperature which increases as the flow is passed therethrough; and c. transferring the heat to a heat transfer medium which is arranged outside of and in contact with the reaction vessel and which flows co-currently with the flow through the reaction vessel, wherein the first catalyst catalyzes a reaction which produces a by-product, and the second catalyst catalyzes a reaction which produces a main product from the by-product so that the ratio of the by-product to the main product in the reaction vessel decreases, wherein the first and second catalysts have respective catalyst compositions comprising at least one catalytic material which are one of (a) different at least one catalytic materials or (b) the same at least one catalytic material but which has a respective concentration per unit volume which is different so that respective activities of the first and second catalysts are different from each other, so that heat generation rate during exothermic reaction is controlled by controlling the difference in activity between the first and second catalysts, and so that the first and second regions have different catalytic performances from one another for at least one of (a) product production and (b) heat production, and wherein the first and second catalysts have respective selectivities for producing reaction products which are different from each other so that the first and second regions produce respective reaction products which are different from each other.

14. The catalytic reaction method as claimed in claim 13, wherein the heat transfer medium flows at a constant rate.

15. The catalytic reaction method as claimed in claim 13, wherein the first and second catalysts have respective concentrations per unit volume which are different from one another.

16. The catalytic reaction method as claimed in claim 13, wherein the reaction vessel further comprises at least one additional region provided between the first and second regions, the at least one additional region having a catalytic performance which lies between those of the first and second regions.

17. The catalytic reaction method as claimed in claim 16, wherein the regions are arranged contiguously within the reaction vessel in order of increasing catalytic activity.

18. The catalytic reaction method as claimed in claim 13, wherein the first and second catalysts are composed of respective catalyst compositions, each catalyst composition comprising a mixture of first and second catalytic materials, and each catalyst composition having concentrations of the catalytic materials per unit volume which are different from those of the other catalyst, and wherein the respective reaction products produced in the first and second regions are respective mixtures of at least two products having respective ratios of products to each other which are different between the first and second regions.

* * * * *